United States Patent
Watson (10) Patent No.: US 10,448,051 B2
(45) Date of Patent: Oct. 15, 2019

(54) METHOD AND SYSTEM FOR ENCODING AND TRANSMITTING HIGH DEFINITION 3-D MULTIMEDIA CONTENT

(71) Applicant: DISNEY ENTERPRISES, INC., Burbank, CA (US)

(72) Inventor: Scott F. Watson, Marina Del Rey, CA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 15/645,065

(22) Filed: Jul. 10, 2017

(65) Prior Publication Data

US 2017/0310995 A1    Oct. 26, 2017

Related U.S. Application Data (60) Division of application No. 14/866,284, filed on Sep. 25, 2015, now Pat. No. 9,723,328, which is a
(Continued)

(51) Int. Cl.
   *H04N 13/00*    (2018.01)
   *H04N 19/597*   (2014.01)
   (Continued)

(52) U.S. Cl.
   CPC ......... *H04N 19/597* (2014.11); *H04N 13/341* (2018.05); *H04N 13/344* (2018.05)

(58) Field of Classification Search
   USPC ............ 348/42, 47, 48, 51, 52, 61; 386/326, 386/335, 278
   See application file for complete search history.

(56) References Cited

U.S. PATENT DOCUMENTS 5,117,289 A     5/1992  Farley et al.
5,956,001 A *   9/1999  Sumida .............. G02B 27/2214
                                               345/55
(Continued)

FOREIGN PATENT DOCUMENTS

JP      2005012638 A        1/2005
WO      WO-2008156318 A2 *  12/2008  ......... H04N 13/0048

OTHER PUBLICATIONS

Author Unknown, "Panasonic Proposes Blu-ray Disc Standard for 3D Imagery", http://www.hdtvinfo.edu/news/hd-video-formats/panasonic-proposes-blu-ray-disc-standard- ..., Nov. 25, 2008, 1 page.
(Continued)

*Primary Examiner* — Daquan Zhao
(74) *Attorney, Agent, or Firm* — Dorsey & Whitney LLP (57) ABSTRACT

One particular implementation of the present invention may take the form of a method and system for encoding decoding 3-D multimedia content. In one example, visual content having a plurality of source frames may be processed to create a plurality of first and second type frames from each of the plurality of source frames. The plurality of first and second type frames may be arranged to create modified content, and generating a distinguishing signal for the visual content, which may distinguish the first type frame from the second type frame. In another examples, the present invention may take the form of a method decoding 3-D multimedia content encoded with at least content frames and null frames. The method may operate to receive the 3-D multimedia content, extract at least one content frame, at least one null frame, and display information. The method may further operate to reconstruct the content and null frames in a display-sequential manner using the display information to indicate the display order of the at least one content frame. In some examples, the method and system for encoding and
(Continued)

decoding multimedia content may encode the multimedia content such that the at least one null frame may not be displayed by a display device.

19 Claims, 8 Drawing Sheets

Related U.S. Application Data continuation of application No. 13/651,320, filed on Oct. 12, 2012, now Pat. No. 9,172,975, which is a continuation of application No. 12/547,376, filed on Aug. 25, 2009, now Pat. No. 8,289,374.

(51) Int. Cl.
*H04N 13/341* (2018.01)
*H04N 13/344* (2018.01)
*H04N 5/92* (2006.01)

(56) References Cited

U.S. PATENT DOCUMENTS

| | | | |
|---|---|---|---|
| 6,208,348 B1 | 3/2001 | Kaye | |
| 6,456,432 B1 | 9/2002 | Lazzaro et al. | |
| 6,515,659 B1 | 2/2003 | Kaye | |
| 6,686,926 B1 | 2/2004 | Kay | |
| 7,010,046 B2 | 3/2006 | Trevers et al. | |
| 7,102,633 B2 | 9/2006 | Kaye | |
| 7,116,323 B2 | 10/2006 | Kaye | |
| 7,116,324 B2 | 10/2006 | Kaye | |
| 7,912,349 B1 | 3/2011 | Bushell et al. | |
| 8,139,930 B2 | 3/2012 | Ogawa et al. | |
| 2003/0156188 A1 | 8/2003 | Abrams, Jr. | |
| 2004/0252756 A1 | 12/2004 | Smith et al. | |
| 2005/0213936 A1* | 9/2005 | Schultz | H04N 5/783 386/343 |
| 2008/0198920 A1 | 8/2008 | Yang et al. | |
| 2008/0267142 A1 | 10/2008 | Mushkin et al. | |
| 2009/0009591 A1* | 1/2009 | Yabe | H04N 13/156 348/46 |
| 2010/0074594 A1 | 3/2010 | Nakamura et al. | |
| 2010/0157024 A1* | 6/2010 | Park | H04N 13/359 348/51 |
| 2011/0050860 A1 | 3/2011 | Watson | |
| 2013/0039636 A1 | 2/2013 | Watson | |

OTHER PUBLICATIONS

Author Unknown, "Panasonic Proposing 3D Blu-ray Standard", http://www.trustedreviews.com/tvs/news/2008/11/25/Panasonic-Proposing-3D-Blu-ray-Sta . . . , Nov. 25, 2008, 2 pages.

Author Unknown, "Philips 3D Solutions", http://www.wowvx.com/nm/Philips3DSolutions.html, at least as early as Sep. 15, 2008, 2 pages.

Prosecution Document, "U.S. Notice of Allowance and Interview Summary dated Jun. 14, 2012", U.S. Appl. No. 12/547,376, filed Aug. 25, 2009, 11 pages.

* cited by examiner

METHOD AND SYSTEM FOR ENCODING AND TRANSMITTING HIGH DEFINITION 3-D MULTIMEDIA CONTENT

CROSS-REFERENCE TO RELATED APPLICATIONS

This application is a Divisional of U.S. patent application Ser. No. 14/866,284, entitled "Method and System for Encoding and Transmitting High Definition 3-D Multimedia Content", filed Sep. 25, 2015, which is a continuation of U.S. patent application Ser. No. 13/651,320, entitled "Method and System for Encoding and Transmitting High Definition 3-D Multimedia Content," filed Oct. 12, 2012, now U.S. Pat. No. 9,172,975, which is a continuation of U.S. patent application Ser. No. 12/547,376, entitled "Method and System for Encoding and Transmitting High Definition 3-D Multimedia Content," filed Aug. 25, 2009, now U.S. Pat. No. 8,289,374, which are incorporated by reference in their entirety herein.

FIELD OF THE INVENTION

Aspects of the present invention relate to display of 3-D multimedia content. More particularly, aspects of the present invention involve a system and method for encoding and transmitting high definition 3-D content to a display device.

BACKGROUND

Three dimensional (3-D) imaging, or stereoscopy, is a technique used to create the illusion of depth in an image. In many cases, the 3-D effect of an image is created by providing a slightly different image of a scene to each eye of a viewer. The slightly different images may present two perspectives of the same object, where the perspectives differ from each other in a manner similar to the perspectives that the viewer's eyes may naturally experience when directly viewing a three dimensional scene. When the two images are viewed at the same time, the image is perceived as having depth.

Several methods exist to provide a 3-D effect to an image. An anaglyph image may present the two images for each of the viewer's eyes in different colors, such as red and blue-green. To achieve the 3-D effect, the viewer wears glasses with color filter lenses that filter the color(s) so as to present only one of the images for each eye. Thus, the viewer's right eye receives the red image while the viewer's left eye receives the blue-green image. When the left-eye image and the right-eye image are viewed at the same time, the viewer perceives a 3-D effect. In another example, left-eye and right-eye image are superimposed through polarizing filters such that one image is clockwise polarized and the other image is counter-clockwise polarized. The viewer wears glasses with polarized lenses such that each eye receives only one of the images. In a third example, the 3-D images are presented in a time-multiplexed fashion, such as alternating between images meant for the viewer's right eye and the viewer's left eye. The viewer wears glasses that shutter between the viewer's eyes, allowing the right eye to receive the right eye image and the left eye to receive the left eye image.

To transmit 3-D or "stereo" multimedia content (such as 3-D video or film), both left-eye and right-eye images are sent to a display device in a manner that allows the left-eye and right-eye images to be separately presented to the user's left eye and right eye, respectively. Conventional digital interfaces and transmission standards are not designed to support 3-D content that involves transmitting twice as many video frames as non-stereo video. This is a particular problem for high definition video which requires significantly more data for each frame as compared to standard definition video. Techniques have been developed, however, to squeeze a left-eye frame and a right-eye frame into the space of a single video frame allowing a stereo video to be communicated using conventional digital interfaces and transmission standards. For example, one method transmits the images for both eyes of a 3-D image by fitting the images for the right and left eye into a single frame, in a side-by-side arrangement (e.g., dividing the conventional frame into a left half and right half) or over-under arrangement (e.g., dividing the conventional frame into an upper half and a lower half). In another example, anamorphic squeeze techniques are used to squeeze each of the left-eye and the right-eye images into the smaller space for transmission as a single frame. The two images may then be separated, expanded and presented to the viewer in a manner consistent with 3-D techniques by the display device. Another method involves transmitting both images in a checkerboard fashion in a single frame. Thus, the pixels of the images for each eye are interleaved into a single frame on a pixel-level basis. These methods may provide the data for the two images needed for a single 3-D image at the same rate as 2-D images may be transmitted. However, because two images are being presented in a single frame, the resolution of each image is less than if each frame contained a single image. Thus, the images provided in these schemes may not meet the high resolution requirements of high definition video.

High definition video generally refers to multimedia content presented in a display resolution of 720 p or higher. A resolution of 720 p indicates that each frame of the image presented has a vertical resolution of 720 pixel lines and that each pixel line of the image is refreshed when the image is updated. A high definition television mode specified as 720 p typically has an aspect ratio of 16:9 and, therefore, has a horizontal resolution of 1280 pixels, resulting in 921,600 (720×1280) pixels in each frame. Further, high definition video is often transmitted at 60 frames per second, meaning that the entire image is updated 60 times per second in progressive modes. Video with higher resolutions and frame rates may also satisfy the high definition standard.

Since 3-D content is often transmitted by squeezing or interleaving the images for the left and right eye into a single frame, each of the left-eye and right-eye images can use only half of the pixels available in the frame. For example, a 720 p frame can be vertically divided but such a division allows only 360 vertical lines for each image. While some methods exist to improve the appearance of the squeezed or combined images, the transmitted images may no longer satisfy the quality expectations of a high definition image. Thus, what is needed, among other things, is a method and system for encoding and transmitting 3-D multimedia content that meets the resolution expectations of high definition video and is at the same time compatible with existing digital interfaces and transmission standards.

SUMMARY

One implementation may take the form of a method for encoding visual content. The method may comprise the operation of receiving by a processing element the visual content. The visual content may comprise a plurality of source frames. The method may also comprise the operation of creating by the processing element, for each source frame in the plurality of source frames, a first type frame and a second type frame. The first type frame and second type frame may utilize a full resolution of a display device for displaying the visual content. The method may further comprise the operation of arranging by the processing element the plurality of first type frames and second type frames to define modified content. The method may also comprise the operation of generating by the processing element a distinguishing signal for the visual content. The distinguishing signal may distinguish the first type frame from the second type frame.

Another implementation may take the form of a method for decoding three-dimensional (3-D) multimedia content. The method may comprise the operation of receiving by a processing element the 3-D multimedia content. The 3-D multimedia content may be encoded and comprise at least content frames and null frames. The method may further comprise the operation of extracting by the processing element the encoded 3-D multimedia content to obtain at least one content frame, at least one null frame, and display information corresponding to the at least one content frame and the at least one null frame. The method may also comprise the operation of using the display information, reconstructing by the processing element the at least one content frames and the null frames in a display-sequential manner to indicate the display order of the at least one content frame.

Another implementation may take the form of a method for decoding encoded content. The method may comprise the operation of receiving by a processing element the encoded frames. The encoded frames may comprise at least one content frame and at least one null frame. The method may also comprise the operation of detecting by the processing element a synchronization signal corresponding to the encoded frames. The method may further comprise the operation of and compiling by the processing element the encoded frames into a frame-sequential stream of frames according to the detected synchronization signal, such that the at least one null frame is not displayed when the frame-sequential stream of frames is displayed.

Another implementation may take the form of a system comprising a display device and a decoder. The system may comprise a display device capable of displaying 3-D multimedia content. The system may also comprise a decoder configured to operate to extract an encoded stream of frames having a first image type, a second image type, and at least one null image from a 3-D content source. The decoder may further operate to obtain synchronization information from the encoded stream of frames and generate a frame-sequential stream of frames for the first image type, the second image type, and the at least one null image based on the synchronization information. The decoder may also be configured to operate to transmit the frame-sequential stream of frames to a display device. The display device may be configured to discard the null images when the frame-sequential stream of frames is displayed.

DETAILED DESCRIPTION

Implementations of the present invention involve methods and systems for encoding and/or transmitting high definition 3-D multimedia content, such as 3-D video. The frames of the 3-D video may be encoded or transmitted in a frame-sequential fashion, with some image frames intended for the viewer's right eye and other frames intended for the viewer's left eye. To account for the addition of frames intended for each eye of the viewer, one embodiment may encode and/or transmit the frames at a frame rate about twice that of a source content or higher. For example, a 30 frame per second 3-D video may be encoded and transmitted at 60 frames per second to account for the separation of the right-eye images and the left-eye images into separate frames. Further, in some implementations, null frames may be inserted into the transmitted or encoded frame stream to accommodate a mismatch between the increased frame rate in accordance with the present invention and an industry standard frame rate. In such an implementation, the null frames may be recognized and discarded by downstream image processing and/or display devices. Such downstream image processing devices may include, but are not limited to, a digital video disc (DVD) player, a digital video recorder (DVR), set-top box (STB) for a satellite or digital cable system, a television, and a personal computer, and such.

In some implementations, a synchronization signal is transmitted in-band or out-of-band to downstream image processing and/or display devices. The synchronization signal instructs the display device on how to distinguish between left-eye and right-eye frames in the frame sequenced stream. Such a synchronization signal may describe the sequence at which each transmitted frame is to be displayed to the viewer. The synchronization signal may be presented to the display device embedded within the content frames (i.e., "in-band") of the multimedia content or, in cases including null frames, embedded within the null frames themselves. Synchronization signals may also be provided out-of-band, such as on a high definition multimedia interface (HDMI) cable or other communication channel to the display device.

In one arrangement, the sequence of image frames and null frames may act as a synchronization signal. In such an arrangement, a display device or other downstream image processing device is configured to automatically determine a cadence to the transmitted frames upon receipt of an initiation signal and use the determined cadence to distinguish and separately display left-eye and right-eye images to a viewer.

Figure 1:
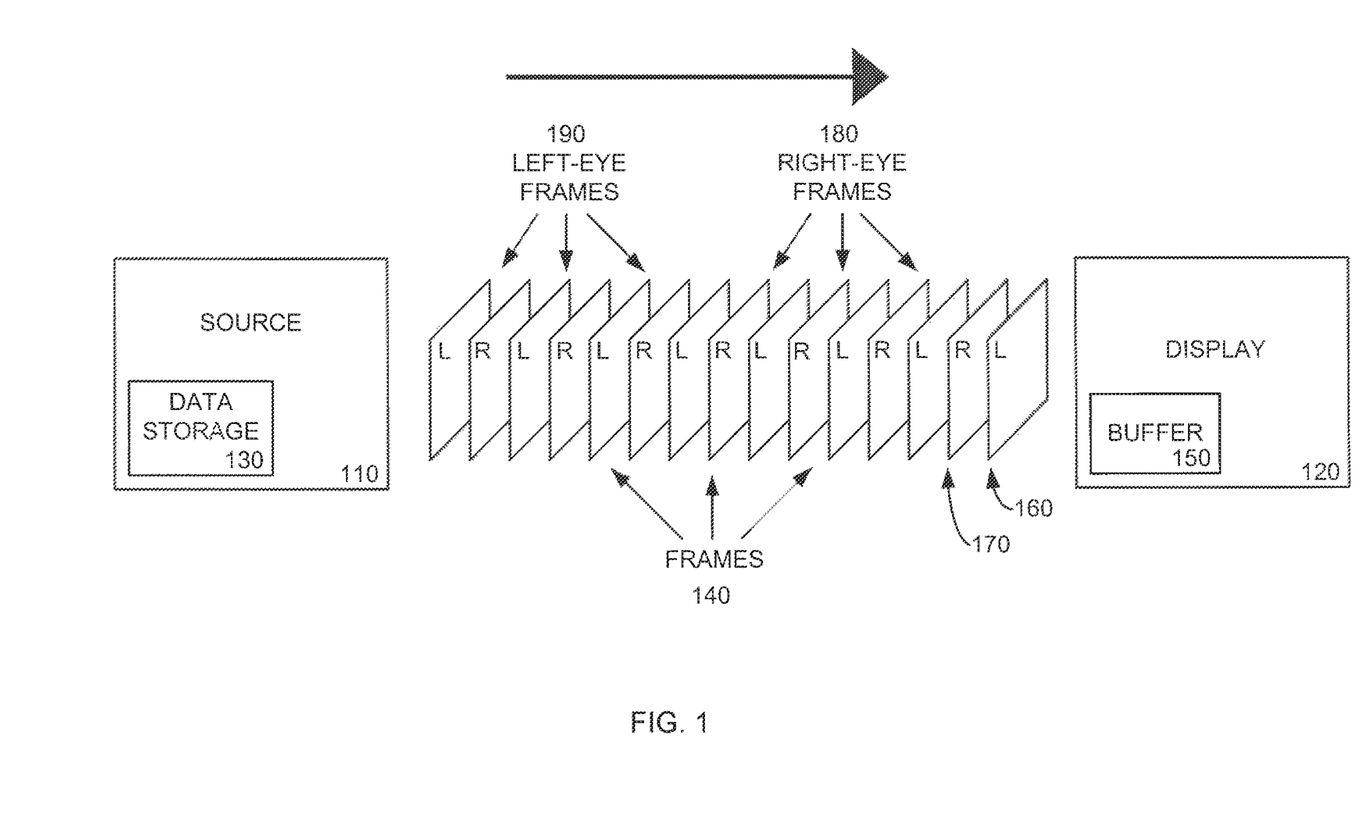
FIG. 1 is a diagram illustrating a system for transmitting high definition 3-D content to a display device.

FIG. 1 is a diagram illustrating a system for transmitting high definition 3-D content between a source 110 and a display 120. The embodiment of FIG. 1 may provide the 3-D content at a resolution that satisfies a high definition video standard by transmitting right-eye frames 180 and left-eye frames 190 in a frame-sequential fashion. The frames 140 may be transmitted to a display device 120 such that the display device 120 presents the frames 140 to the user utilizing a technique to provide the images with a 3-D effect. For convenience, the content is portrayed as a series of frames 140 transmitted from the source 110 to the display 120 in FIG. 1.

Generally, video content may be transmitted by a source device 110 to a display device 120 for display to the viewer. The source device 110 may take many forms, including but not limited to, a Blu-ray Disk® compatible optical disc player, a laptop computer, a personal computer, a set-top box (STB) of a satellite or digital television system and a video game console. Any device that may provide high definition content through an electrical, wireless or optical connection, such as an I/O port, may be a source device 110 and may be used with the embodiments as set forth herein.

In some embodiments, a computer readable data storage medium 130 may be associated with the source device 110 to store the high definition 3-D content. The source device 110 may access the storage medium 130 to retrieve the 3-D content and transmit the content to the display device 120. The data storage medium 130 may take many forms, including but not limited to, an optical disc (such as a Blu-ray Disk® compatible optical media); magnetic storage medium; magneto-optical storage medium; read only memory (ROM); random access memory (RAM); or other types of tangible medium suitable for storing electronic data. Generally, any tangible computer-readable medium capable of storing high definition content may be used with the embodiments described herein and/or store video encoded pursuant to techniques described herein. In one example, the source device 110 is a Blu-ray Disk® compatible player. The 3-D video content is stored on optical disks such that the player retrieves the content from the disk. Upon retrieval, the player transmits frames 140 to a display device 120, such as a television, to display the content to a viewer.

The display device 120 may be any device that may access frames 140 from the frame buffer 150 and present the accessed frames 140 to a viewer. Examples of display devices 120 include, but are not limited to, a liquid crystal display (LCD) or plasma television, a cathode-ray tube (CRT) television, a computer monitor and various types of projection arrangements. To receive the frames 140, the display device 120 may include an interface port that may receive the frames 140 from the source device 110 for display and storage in the frame buffer 150. The interface port may be any port that supports a frame transfer rate of at least 2× the frame rate of the content. Examples of interface ports include those ports conforming to industry standard interface specifications, such as HDMI, Digital Visual Interface (DVI), DisplayPort, etc.

Figure 2:
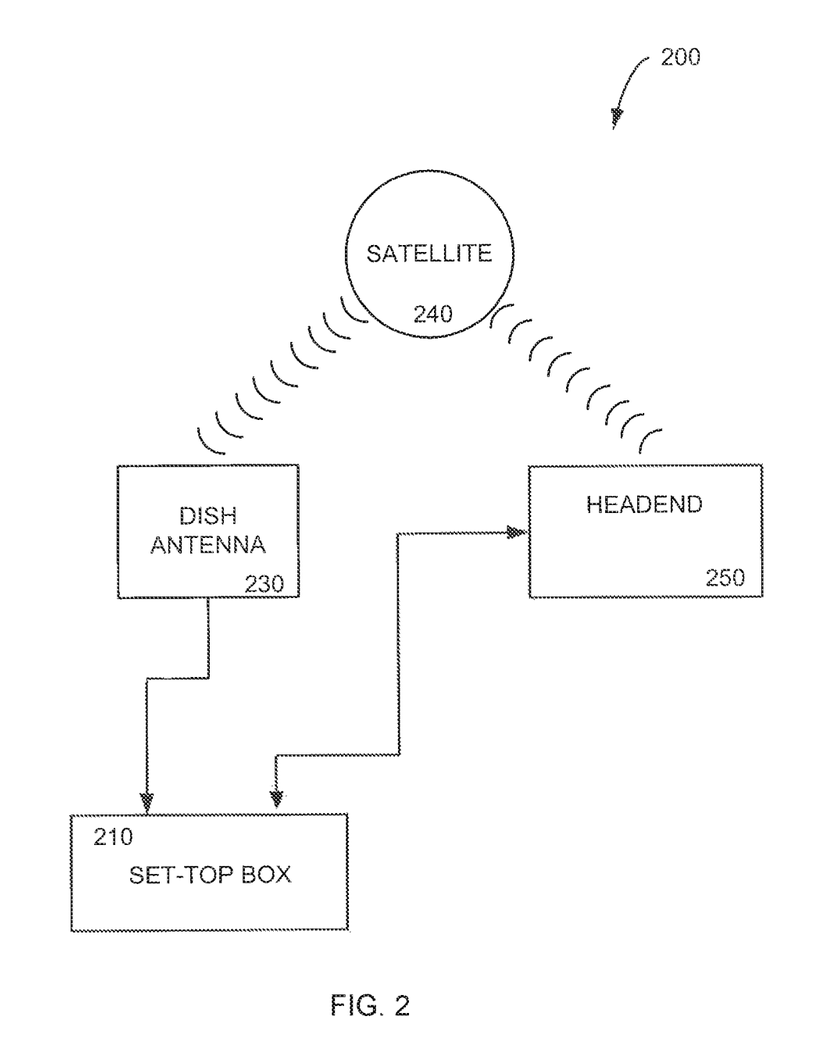
FIG. 2 is a diagram illustrating a system for transmitting a high definition 3-D content to a source device.

In another embodiment, depicted in FIG. 2, the source device 110 may be a STB 210 associated with a distribution system 200, such as a cable, satellite, broadcast, network or other available digital distribution system. In the example of a satellite distribution system 200, the content is transmitted to the STB from a provider, such as a headend 250 of the distribution system 200. The headend 250 transmits the content to the STB 210 through a satellite 240 to a dish antenna 230 electrically connected to the STB 210. Alternatively, the headend 250 may transmit the content directly to the STB 210 through a dedicated cable, such as in a digital cable example. In other embodiments, the content may be provided to the source device 110 from a server through a network connection, such as over the internet.

Returning to FIG. 1, once the high definition content is received by the source device 110, the content is transmitted to a display device 120 that displays the content to a viewer. To transmit the content, the source 110 may be connected with the display device 120 through an electrical, wireless or optical connection. For example, the content may be provided to the display device via a high definition multimedia interface (HDMI) cable. Generally, any communication channel that transfers the data of each frame 140 of the content at a rate sufficient to meet current transmission standards or faster may be used to transmit the content to the display. The video content is transmitted in frames 140 containing the pixels of each discrete image, which when shown consecutively provide moving video. The received frames 140 may then be placed into a frame buffer 150 associated with the display device 120 for access by the display device 120. Frame buffer 150 comprises a computer-readable addressable memory, such as a dual-ported random access memory (RAM). The frame buffer 150 should have sufficient capacity and bandwidth to receive, store and forward at least two frames (one left-eye frame 190 and one right-eye frame 180) at an industry-standard frame rate or higher. The frame buffer can be accessed by display 120 while also loading frames 140 from the frame buffer 150 input such that the frames can be displayed without a perceivable delay when presented to the viewer. To display the content, the display device 120 retrieves the frames 140 from the frame buffer 150 and displays the frames 140 at the correct time and in the correct sequence. Displaying the sequence of frames 140 then appears as a motion video. For example, film is generally presented at 24 frames per second (fps) and television and video are generally presented at 30 fps.

To present the continuous motion effect for 3-D content, the frame rate of the 3-D content may be increased to at least two times (2×) the frame rate of the content source to include both the frames for the viewer's right-eye and the viewer's left-eye. For example, the frame rate for non-stereo video is generally presented at 30 fps. To transmit both the right-eye image and left-eye image for the 3-D content, the separate eye images may be encoded and/or transmitted to the display device 120 in different frames. One frame may include a left-eye image while another frame may include the corresponding right-eye image. The separated frames may then be encoded and/or transmitted at a rate of 60 fps, with a sequence of 30 frames containing the images for the viewer's right eye and a sequence of 30 frames containing the images for the viewer's left eye for every second of the content. Similarly, 3-D film content is provided at a rate of 48 fps, with 24 frames for the viewer's right eye and 24 frames for the viewer's left eye.

As shown in FIG. 1, the content transmitted to the display device 120 is shown as a series of frames 140. However, the display device 120 may not necessarily receive all of the data corresponding with a single frame 140 from the source device 110 at once. Rather, the source device 110 may provide a stream of digital data to the display device 120 that represents the pixels of each frame 140 of the content. Such is the case, for example, if the content is compressed or encrypted. The display device 120 or other downstream image processing device may then decompress, decrypt or otherwise decode the incoming data, build or compile each frame 140 of the image to be displayed from the provided data and store the compiled frames 140 in the buffer 150 for display at the appropriate time. Thus, the content may be transmitted to the display device 120 in any manner that enables display device 120 to access and/or reconstruct frames 140 at a frame rate that is a least twice the frame rate of the content source.

In one implementation, the frames 140 are transmitted to the display device 120 in a frame-sequential fashion, such that the content frames 140 are provided in a sequence of left-eye and right-eye frames that is recognized by the display device 120 for proper display to a viewer. In the embodiment depicted in FIG. 1, for example, right-eye frames 180 and left-eye frames 190 are transmitted in an alternating, interleaved, frame-sequential fashion. Thus, a single left-eye frame 160 containing an image intended for the viewers left eye is transmitted, followed by a single right-eye frame 170 containing an image intended for the viewers right eye. This pattern of transmitting the frames of the content may be repeated, alternating left-eye frames ("L") 190 and right-eye frames ("R") 180, while the source device 110 is providing the content to the display device 120. Alternatively, the frames may be transmitted to the display device 120 such that two right-eye frames 180 are transmitted to the display 120, followed by two left-eye frames 190, and so on. In yet another example, several right-eye frames (e.g., 24 or 30 right eye frames) may be followed by several left-eye frames (e.g., 24 or 30 right eye frames). Generally, the frames 140 may transmitted to the display 120 in any order, as long as the display device 120 may place the frames 140 in the proper order for presentation to the viewer without a perceivable delay in the presentation of the content to the viewer.

To maintain the desired frame rate for the 3-D content, the frames 140 are transmitted at a frame rate of at least two times (2×) compared to the frame rate of the content source. For example, in a conventional arrangement, video is often rendered at 30 fps, with each frame containing resolution-compromised (e.g., compressed, squeezed or the like) versions of both the left-eye image and the right-eye image. In accordance with aspects of the present invention, the left-eye and right eye images are transmitted in different frames 140 such that each image has the full resolution available in the entire frame 140. Thus, each 3-D image comprising a left-eye image and a right-eye image is transmitted in two frames 140, a single frame 160 for the left-eye image and a single frame 170 for the right-eye image. Therefore, 3-D video content may be encoded and/or transmitted at a rate of 60 fps. Similarly, 3-D film content is provided at a rate of 48 fps, which is twice the frame rate (24 fps) of conventional film content. Further, by transmitting the frames at a higher rate, the high definition resolution of each image is maintained since there is no need to compress or squeeze the right-eye and left-eye images for transmission.

Broadcast and electrical interface standards exist for transmitting high definition content at 60 fps with a resolution of 720 p. Conventional film content at 24 fps and video content at 30 fps require less than or equal to half the bandwidth available in the existing transmission infrastructure and electrical interface standards. Aspects of the present invention take advantage of the available bandwidth to transmit at least twice as many frames as compared to the conventional content, allocating substantially half of the frames for left-eye and half for right-eye. In this manner, aspects of the present invention enable 3-D multimedia to be transmitted as high definition without the loss of resolution to the images.

For 3-D video content, which is shown at a rate of 30 fps, transmitting alternating left eye and right eye frames requires 60 fps and thus fits within the 60 fps available for high definition video. However, 3-D cinema content, provided at 24 fps requires 48 fps to handle left-eye and right-eye frames and so does not fit neatly within the 60 fps rate. In the case of film content, additional frames are used in implementations of the present invention to adapt the 48 fps rate into the 60 fps transmission rate of high definition video transmission and interface conventions.

Figure 3:
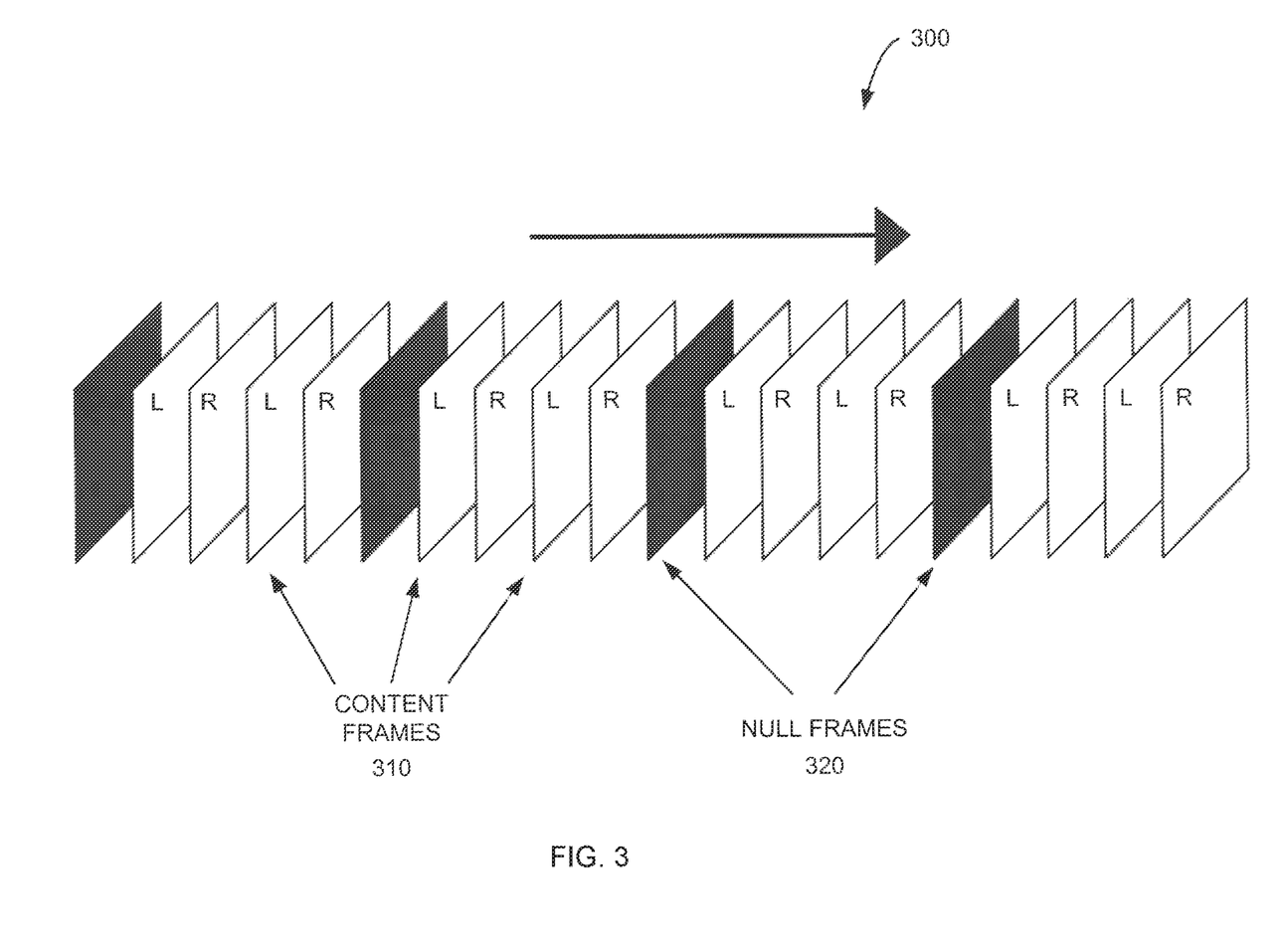
FIG. 3 is a diagram illustrating a first embodiment of a series of frames containing 3-D content and null frames.

FIG. 3 is a diagram illustrating a series of frames including 3-D content frames 310 and null frames 320 encoded pursuant to aspects of the invention. This embodiment illustrates how high definition 3-D cinema multimedia content may be transmitted using a 60 fps transmission rate. A greater or lesser number of null frames 320 may be provided within the transmission stream 300 so as to adapt to other transmission rates and/or other source content frames rates. For convenience, the content is portrayed as a stream of frames 300 in FIG. 3. The stream 300 includes content frames 310 (including both left-eye image frames ("L") and right-eye image frames ("R") and null frames 320, shown in black.

3-D cinema content with a source frame rate of 24 fps is produced with separate left-eye and right-eye frames at a rate of 48 fps. In one embodiment, the right eye frames and left eye frames are transmitted in a frame-sequential fashion, alternating between left and right frames. However, for 3-D cinema content, the content frames 310 including the images of the content only require 48 fps of the 60 fps capacity, leaving 12 fps in the transmission stream 300 to account for. Thus, null frames 320 are included within the stream 300 to occupy the 12 fps capacity that is not used to transmit content frames 310.

The null frames 320 included in the stream of frames 300 may include any information, image, pattern or other indicia recognized by the display device 120 as a null frame 320. Generally, the display device 120 is configured to identify the null frames 320 within the stream of frames 300 either implicitly (e.g. a frame that does not bear characteristics of a content frame 310 is deemed to be a null frame 320) or explicitly (e.g., indicia within a frame identifies the frame as a null frame 320). For example, the null frames 320 may include only black pixels that signal the display device 120 to ignore the null frames 320 or otherwise handle the frames as null frames 320. The occurrence of a null frame 320 may also signal display device 120 that the next subsequent frame is a left-eye frame 190 or a right-eye frame 180, for example. In this manner, the null frames 320 can be used to convey signaling information that can be used by display device 120 to properly sequence playback.

Figure 4:
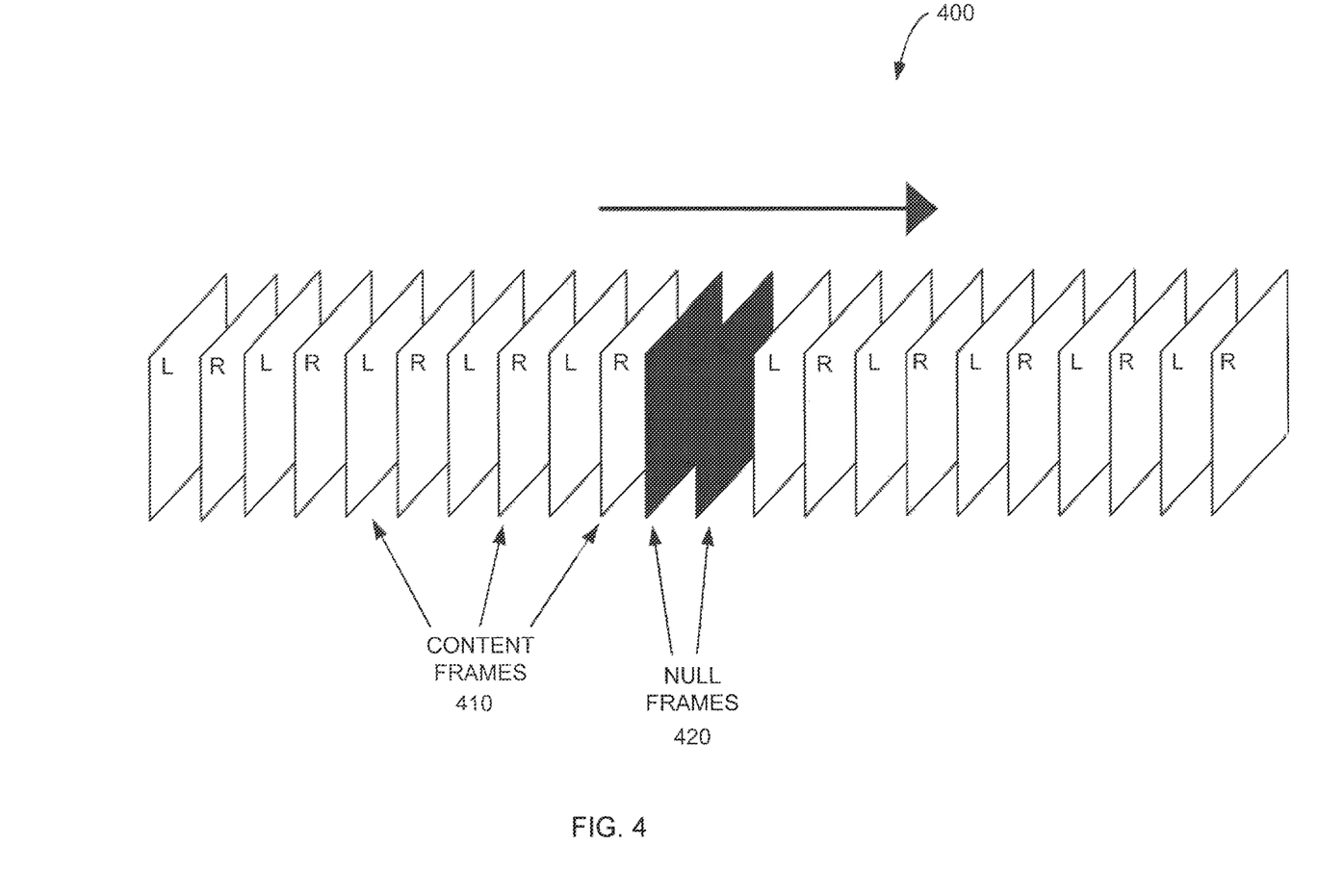
FIG. 4 is a diagram illustrating a second embodiment of a series of frames containing 3-D content and null frames.

Null frames 320 are inserted into the frame stream 300 as every fifth frame, in one possible arrangement. Thus, four content frames 310 may be transmitted for each null frame 320, alternating between left-eye images and right-eye images in the embodiment illustrated in FIG. 3. However, the null frames 320 of the frame stream 300 may be placed anywhere within the frame stream 300. For example, in the embodiment of FIG. 4 null frames 420 are placed after ten content frames 410 are transmitted. Further, to ensure that twelve null frames are included in the stream 400 (to transmit 48 frames in a 60 fps transmission rate), two consecutive null frames 420 may be included in the stream 400.

In conventional 2D content, every frame is essentially similar to every other frame in that there is no left-eye or right-eye separation at the display device 120. When displaying 3D content it is important to ensure that the display remains able to properly pair left-eye 190 and right eye images 180 and to accurately determine whether a particular image is a left-eye image or a right-eye image. To assist the display device 120 in presenting the content correctly, a synchronization signal typically provided to the display device 120 to instruct the display device 120 as to which frames 140 are to be presented and in which order the images are to be displayed to create the 3-D effect.

Figure 5:
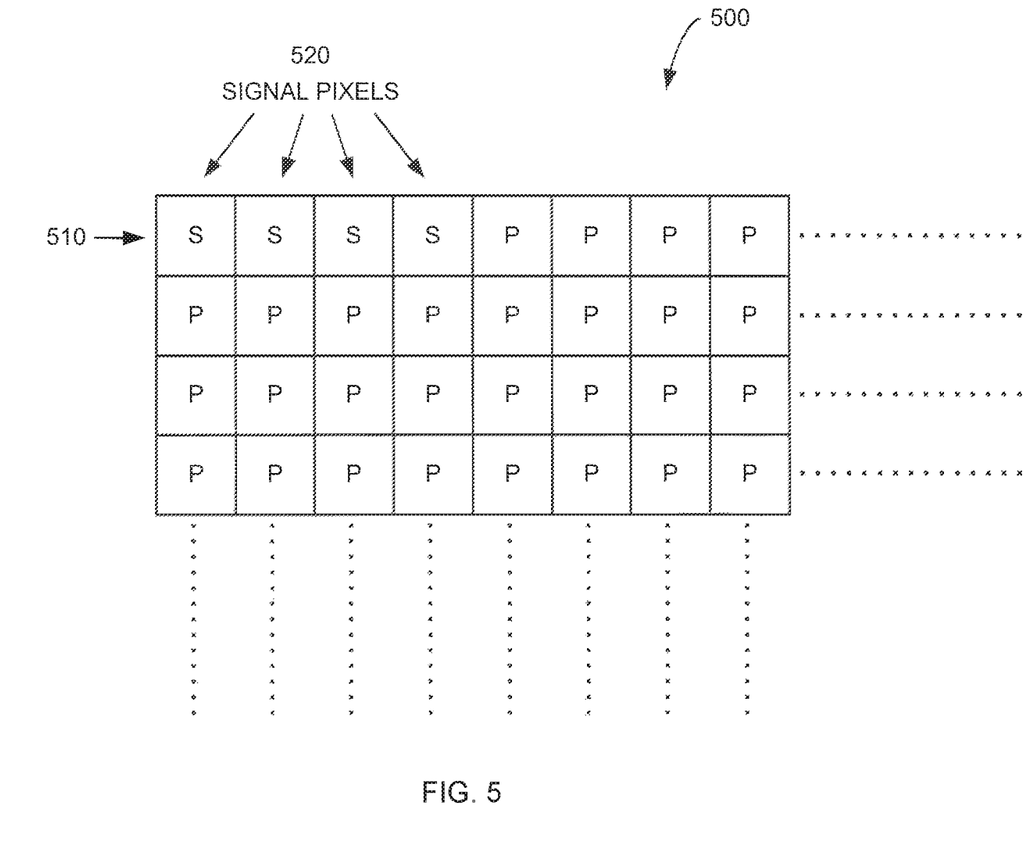
FIG. 5 is a diagram illustrating pixels of a 3-D multimedia frame including an in-line synchronization signal contained within the first line of pixels.

FIG. 5 is one embodiment for providing a synchronization signal by including an in-band synchronization signal contained within a frame 500. FIG. 5 illustrates several pixels of a frame 500, such as the pixels of the upper rightmost corner of the frame image. Signal pixels 520 designated by "S" represent synchronization pixels embedded within the frame 500 while pixels designated by "P" represent data pixels. Frame 500 may be a content frame (310, 410) or a null frame (320, 420).

In this example, the synchronization signal takes the form of data embedded within a line of pixels 510 of the frame 500, such as the first line 510 of the frame 500. Alternatively, the synchronization signal may be embedded within any pixels of the frames of the content in a manner that allows display device 120 to identify the pixels used for the synchronization signal. The synchronization signal is read by the display device 120 from the frame 500 when the frame 500 is received and processed.

As shown in FIG. 5, the content frame 500 is composed of a set of pixels. For example, in one embodiment the frame 500 may be 1280 pixels wide and 720 pixels tall. Each pixel of the frame 500 may include a small part of the overall image presented by the frame 500. However, the pixels of each frame 500 may also be utilized to transmit a synchronization signal to the display device 120 by altering the color of the signal pixels 520 representing the synchronization signal within the frame 500. For example, signal pixels 520 may be all black to signal the display device 120 that the frame is a left-eye frame. Generally, the signal pixels 520 may be any color that signals to the display device 120 the proper sequence or type of the frame 500. Further, the synchronization signal pixels 520 may be any number of the pixels or in any location within the frame 500. For example, a single black pixel in the upper right corner of the frame 500 may indicate a left-eye image frame while a single white pixel in the same position may indicate a right-eye image. In this manner, the 3-D content provider has control over the sequence of the content by controlling the color of the signal pixels 520.

Upon receipt, the synchronization signal provides an indication enabling the display device 120 to determine whether a particular frame 500 or group of frames 140 are left-eye or right-eye frames. For example, the synchronization signal may inform the display device 120 that the frame 500 is intended for the left eye of the viewer. The display device 120 then processes the frame 500 accordingly, such as placing the frame 500 in the proper order in the frame stream being displayed. In other embodiments, the synchronization signal enables the display device 120 to pair a particular left-eye frame 160 with a matching right-eye frame 170 to create the 3-D image. Generally, the synchronization signal may include any information that may assist the display device 120 in compiling and displaying the 3-D content.

In the embodiment shown in FIG. 5, the synchronization signal is a four-pixel signal contained within the first line of pixels 510 of the image frame 500. Thus, pixels 1-4 of the first line of pixels 510 of the frame 500 contain the signal pixels 520 of the synchronization signal. However, the synchronization signal pixels 520 are not required to be transmitted on the first line of pixels 510 of the frame 500. Rather, the synchronization signal pixels 520 may be included anywhere within the frame 500. Other embodiments may instruct the display device 120 to look in a particular area within the frame 500 to locate and read the synchronization signal pixels 520.

The display device 120 is configured to recognize when synchronization signal pixels 520 are embedded within the frame 500 and adjust the display of the frame 500 accordingly. Further, the display device 120 may be configured to not present the synchronization signal pixels 520 to the viewer. Thus, in the example where the synchronization signal pixels 520 are located in the first line of pixels 510 of the frame 500, the display device 120 may be configured to not display the first line of pixels 510 to the viewer. Instead, the display device 120 may convert the first line of pixels 510 into an all black line for presentation to the viewer or may disregard the line altogether. In this manner, a synchronization signal may be embedded within the transmitted frames 140 that may instruct the display device 120 on how to compile the frames 140 and, in some cases, the sequence in which the frames 140 should be displayed.

One disadvantage to including the synchronization signal in-band is that the viewer may detect or otherwise recognize the altered pixels of the image. Thus, other embodiments may provide the synchronization signal to the display device 120 without embedding the signal within the content frames 140 of the content. In such embodiments, the synchronization signal may be provided to the display device 120 out-of-band over an existing broadcast/interface specification. For example, the synchronization signal may be provided to the display device 120 via an HDMI cable or similar interface. Generally, any communication channel may be used to transmit the synchronization signal to the display, including wireless channels or coaxial cable. The synchronization signal may be a single bit or several bits transmitted to the display device 120 over the out-of-band interface to indicate the sequence and/or type of frame being transmitted. The synchronization signal may be transmitted in an allowed space within the specification of the standard interface, such as in a header within the information being transmitted over the interface. The display device 120 may then interpret and process the synchronization signal in a similar manner as described above.

It is not required that a synchronization signal be provided to the display 120 for every transmitted frame. Rather, a synchronization signal may be provided to the display device 120 to set a cadence for the incoming frames 140. For example, the display device 120 may be configured to recognize a left eye or right eye designation for the incoming frames 140 based on a synchronization signal that begins the cadence. Null frames (320, 420) are inserted into the transmitted frame stream 300 in some embodiments. In the embodiments shown in FIG. 3 with a null frame 320 after every four content frames 310, the display device 120 may be configured to recognize a left eye designation for the frame 310 that immediately follows the null frame 320 and alternate designations for every frame 310 that follows until another null frame 320 arrives. Thus, the display device 120 may then recognize a right eye designation to the next frame and continue alternating between a left eye designation and right eye designation until the next null frame 320 is detected. The display device 120 may also be configured to recognize a right eye designation for the frame 310 following the null frame 320 and alternate with a left eye designation. However, in this embodiment, the null frames 320 of the frame stream 300 would likely be set up in such a manner that the frames 310 that follow the null frames 320 would always be intended for the same eye and thus receive the same designation. Generally, however, the display device 120 may recognize any arbitrary pattern of left-eye and right-eye images that follows a null frame 320.

In a similar embodiment, the null frames 320 themselves may carry the synchronization signal information for the frame 310 that follows the null frame 320. In this example, the display device 120 may receive and recognize a null frame 320 as described above. However, in this example, the null frame 320 may include a synchronization signal to instruct the display or initiate a cadence. The synchronization signal may instruct the display device 120 to recognize a left-eye or right-eye designation for the frame 310 following the null frame 320. Further, the synchronization signal may instruct the display device 120 to alternate between left and right designations as described above on all incoming frames 310 until the next null frame 320 is received.

Figure 6:
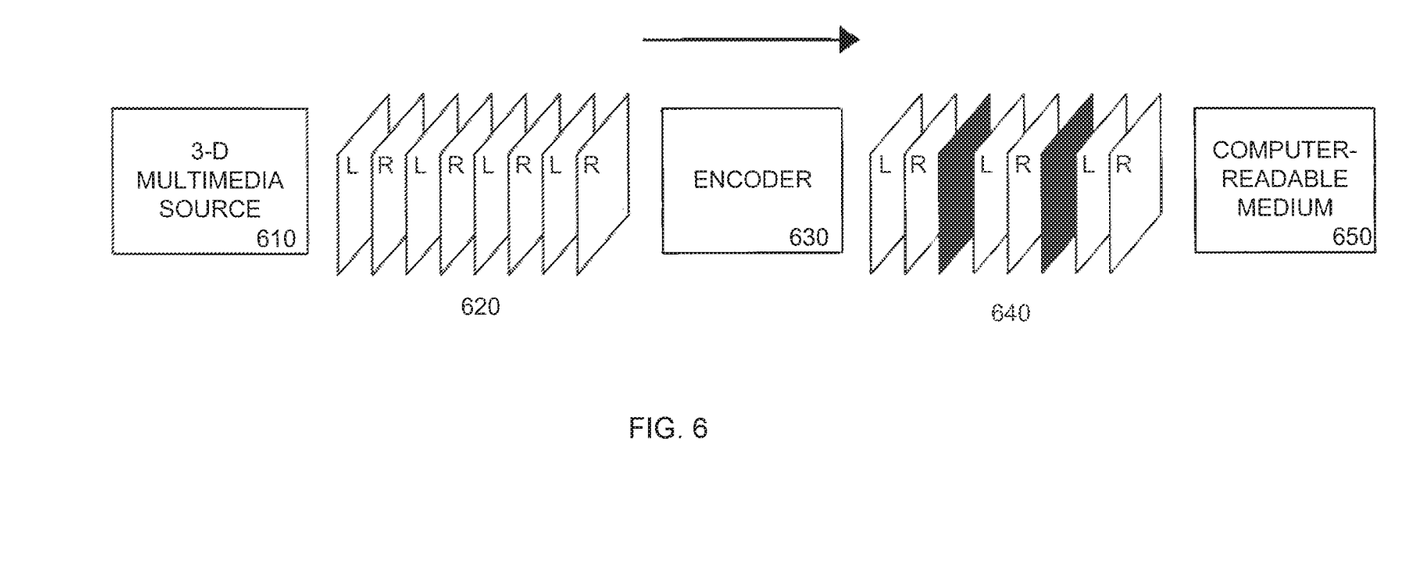
FIG. 6 is a block diagram illustrating a system for encoding high definition 3-D multimedia content to a computer-readable medium.

FIG. 6 is a block diagram illustrating a system for encoding high definition 3-D multimedia content to a computer-readable medium. The system may include a telecine or similar apparatus to convert and encode 3-D multimedia content from film or video onto a computer-readable medium.

The system of FIG. 6 may include an encoder 630 that may be configured to encode a stream of frames 620 from a 3-D source 610 to a computer-readable medium 650. In one embodiment, the 3-D source 610 may be a 3-D film or video involving multiple frames 620. The frames 620 may be structured and presented to a viewer as described above to create a 3-D image or series of 3-D images. In other embodiments, the 3-D content is a digital data file containing information representing the frames 620 of the multimedia source 610. Generally, any source involving a series of frames may be used with the embodiment. The frames 620 of the source 610 may be transmitted to the encoder 630 for encoding and storage on a memory medium 650.

The encoder 630 may receive the frames 620 and encode the 3-D content in a similar manner as described above with reference to FIGS. 1-4. The frames 620 may be encoded in an frame-sequential fashion 640, alternating between the left-eye frame and a right-eye frame. Further, the frames 620 of the content may be encoded to provide a particular frame rate to the content, such as 60 fps. For sources with frame rates below 30 fps, the encoder 630 may insert several null frames into the frame-sequential frames 640 to ensure that the content is encoded at a particular frame rate.

To insert the null frames into the frame stream 640 of the content, the encoder 630 may ascertain the frame rate of the source content 610. If the encoder 630 determines that the frame rate of the source 610 is less than 30 fps, the encoder 630 inserts null frames into the frame stream 640 of the content to provide a 60 fps frame rate to the encoder 630, including the added null frames. For example, a typical frame rate of 3-D film is 24 fps which results in 48 fps when left-eye and right-eye frames are transmitted separately in accordance with the present invention. A source 610 rendered at 24 fps may include 12 null frames to provide a 60 fps frame rate of the content (48 frames of content and 12 null frames). In this manner, 3-D content may be encoded at a frame rate and resolution that satisfies broadcast interface standards.

The encoder 630 may also include the synchronization signal into the encoding of the content 610. The synchronization signal may be encoded within each frame of the multimedia content, within the null frames of the frame stream 640 or provided out-of-band to the display, such as an available HDMI interface.

Once encoded, the high definition 3-D content may be recorded on a computer-readable medium or otherwise distributed. The memory medium 650 may take many forms, including but not limited to, an optical disc (such as a Blu-ray Disk® compatible optical disc); magnetic storage medium; magneto-optical storage medium; read only memory (ROM); random access memory (RAM); external hard drive; flash memory or other types of medium suitable for storing electronic data.

Figure 7:
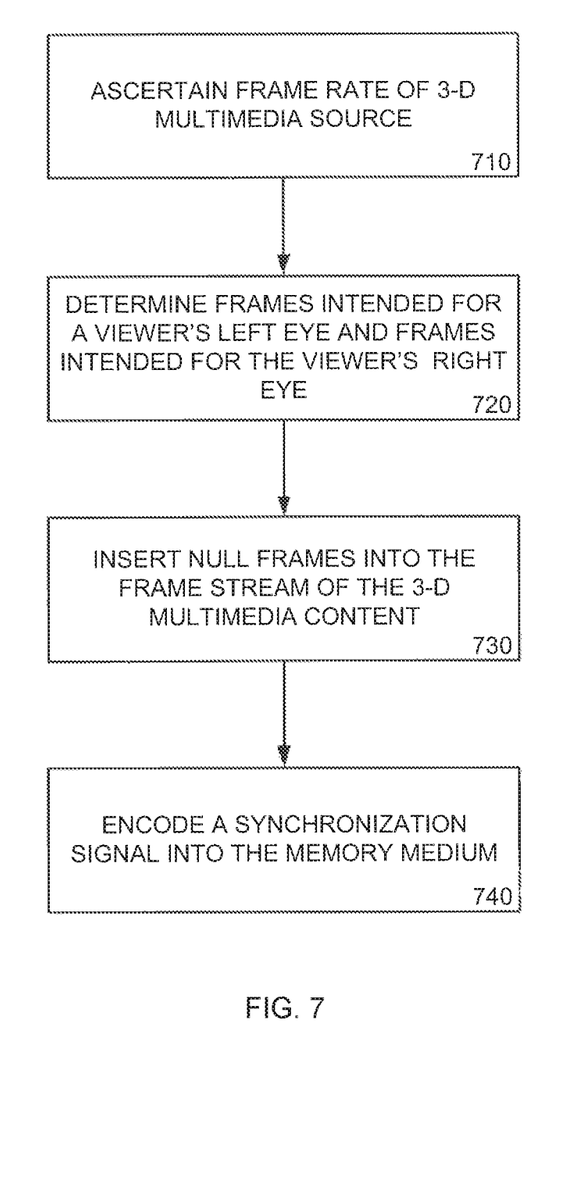
FIG. 7 is a flowchart of a method for encoding high definition 3-D content to a computer-readable medium.

FIG. 7 is a flowchart of a method for encoding high definition 3-D content to a computer-readable medium in accordance with the present invention. The method may be practiced by the encoder 630 of FIG. 6 or a similar device to encode 3-D content to a computer-readable medium or otherwise distribute the 3-D content.

In operation 710, the frame rate of a 3-D multimedia source is determined, typically because the source is provided with an indication of the frame rate used by the content creator. Once the frame rate of the 3-D source is determined, the encoder ascertains which of the images of the 3-D content are those images intended to be viewed by the left eye of the viewer and the images intended to be viewed by the right eye of the viewer in operation 720.

In operation 730, null frames may be inserted into the frame stream encoded in operation 730. As explained in more detail above, the null frames may be used to increase the frame rate of the encoded content to 70 fps. The null frames may be inserted into the stream as desired to ensure the 70 fps frame rate.

A synchronization signal may be encoded with the frame stream in operation 740. The synchronization signal may be used to instruct a display device on the manner in which the frames of the content are to be presented. The synchronization signal may be encoded within each frame of the content, within the null frames of the frame stream inserted in operation 730 or provided out-of-band on a separate input to the display.

It should be noted that the flowchart of FIG. 7 is illustrative only. Alternative embodiments of the present invention may add operations, omit operations, or change the order of operations without affecting the spirit and scope of the present invention.

Figure 8:
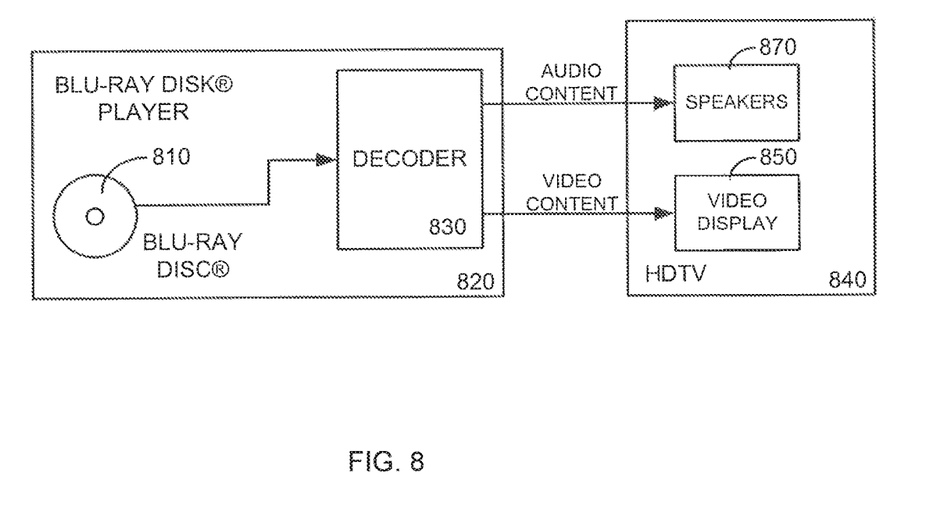
FIG. 8 is a high-level block diagram illustrating a particular system for providing high definition 3-D multimedia content.

FIG. 8 is a high-level block diagram illustrating a particular system for providing high definition 3-D multimedia content in accordance with the present invention. In this particular embodiment, the 3-D content is encoded and stored on Blu-ray Disk® 810. The disk is encoded to include digital information representing the image frames of the 3-D content, including the left-eye and right-eye frames for each image of the content. The information stored on the disk 810 is accessed and read by the Blu-ray Disk® player 820 and transmitted to a decoder device 830.

Blu-ray Disks® 810 generally provide encoded content. Encoding represents a difference in the formats that are typically used for storing or transmitting multimedia content and the formats used for intermediate processing of the multimedia content. The decoder 830 translates between the storage and intermediate formats. For example, stored MPEG content is both compressed and encrypted. Prior to being played at an output device, the stored MPEG content is decrypted and uncompressed by a decoder 830. The decoder 830 may comprise hardware, software, or some combination of hardware and software. Further, decoder 830 may be integrated within the Blu-ray Disk® Player 820, may be a stand-alone device, or may be integrated in the output device or other downstream image processing device.

Once decoded, the content is transmitted to a high definition television (HDTV) 840 over a suitable cable or other electrical connection for display to a viewer. For example, the content may be transmitted to the HDTV 840 over a HDMI cable. Generally, the HDTV 840 is capable of displaying the high definition quality content (i.e., a display resolution of 720 p or higher). Once the content is received, the HDTV 840 presents the content to the viewer. In the example, shown, the HDTV 840 includes a video display 850 for presenting the frames of the content and speakers 870 to provide the sound of the content. In this manner, the 3-D content stored on the Blu-ray Disk® 810 is presented to the viewer for the viewer's entertainment.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A method for encoding visual content for at least one of transmission or display, the method comprising:
   receiving by a processing element the visual content comprising a plurality of source frames;
   creating by the processing element for each source frame in the plurality of source frames a first type frame and a second type frame, wherein each of the first type frame and the second type frame utilize a full resolution of a display device for displaying the visual content;
   arranging by the processing element the plurality of first type frames and second type frames to define a modified content; and
   generating by the processing element a distinguishing signal for the visual content, wherein the distinguishing signal distinguishes the first type frame from the second type frame and the distinguishing signal is utilized by the display device so that the first type frame and the second type frame are displayed in the properly sequenced order; and
   embedding the distinguishing signal in-band with the visual content to generate a modified content that includes the visual content and the in-band distinguishing signal.

2. The method of claim 1, wherein the first type frame and second type frame each comprise a plurality of pixels and the distinguishing signal comprises a predetermined pixel pattern embedded in at least one of the first type frame and the second type frame.

3. The method of claim 1, further comprising:
   determining by the processing element whether a frame rate of the modified content satisfies a standard frame rate; and
   when the frame is below the standard rate, increasing the frame rate to the standard frame.

4. The method of claim 3, wherein increasing the frame rate to the standard frame rate comprises inserting one or more null frames into the modified content.

5. The method claim of claim 4, wherein the distinguishing signal is included with the null frames.

6. The method claim of claim 4, wherein the visual content is three-dimensional (3-D) visual content and wherein the first type frame is a left-eye frame and the second type frame is a right-eye frame.

7. The method of claim 1, wherein the first type frame and second type frame each comprise a plurality of pixels, and the distinguishing signal comprises a predetermined pixel pattern embedded within the visual content in at least one of the first type frame and the second type frame.

8. A method for encoding visual content for at least one of transmission or display, the method comprising:
   receiving by a processing element the visual content comprising a plurality of source frames;
   creating by the processing element for each source frame in the plurality of source frames a first type frame and a second type frame, wherein each of the first type frame and the second type frame utilize a full resolution of a display device for displaying the visual content;
   arranging by the processing element the plurality of first type frames and second type frames to define a modified content; and
   generating by the processing element a distinguishing signal for the visual content, wherein the distinguishing signal distinguishes the first type frame from the second type frame and the distinguishing signal is utilized by the display device so that the first type frame and the second type frame are displayed in the properly sequenced order; and
   embedding the distinguishing signal in-band with the visual content to generate a modified content that includes the visual content and the in-band distinguishing signal.

9. The method of claim 8, wherein the first type frame and second type frame each comprise a plurality of pixels, and the distinguishing signal comprises a predetermined pixel pattern embedded within the visual content in at least one of the first type frame and the second type frame.

10. The method of claim 8, wherein the distinguishing signal determines a display order of the first type frame and second type frame.

11. The method of claim 8, further comprising:
    determining by the processing element whether a frame rate of the modified content satisfies a standard frame rate; and
    when the frame is below the standard rate, increasing the frame rate to the standard frame.

12. The method of claim 8, wherein increasing the frame rate to the standard frame rate comprises inserting one or more null frames into the modified content.

13. The method claim of claim 12, wherein the visual content is three-dimensional (3-D) visual content and wherein the first type frame is a left-eye frame and the second type frame is a right-eye frame.

14. The method of claim 8, wherein generating the distinguishing signal includes altering a color of one or more pixels within the visual content.

15. The method of claim 1, wherein embedding the distinguishing signal comprises replacing one or more pixels of the visual content with pixels having a predetermined color, wherein the predetermined color is different between the first type frame and the second type frame.

16. The method of claim 15, further comprising instructing the display to scan a particular area of the visual content to locate and read the one or more pixels.

17. The method of claim 1, wherein the distinguishing signal enables the display device to pair a particular first type frame with a particular second type frame to create a 3D image.

18. The method of claim 1, wherein frames of the first type frame are alternatingly displayed relative to frames of the second type frame.

19. The method of claim 1, wherein the distinguishing signal is embedded in the visual content of a first subset of the first type frames and second type frames to begin a cadence that designates the properly sequenced order of the first subset and that designates the properly sequenced order of a second subset of the first type frames and second type frames in which the distinguishing signal is not embedded.

\* \* \* \* \*